US012578190B2

(12) United States Patent
Buckingham et al.

(10) Patent No.: US 12,578,190 B2
(45) Date of Patent: Mar. 17, 2026

(54) MEASUREMENT PROBE

(71) Applicant: RENISHAW PLC, Wotton-under-Edge (GB)

(72) Inventors: Jamie John Buckingham, Wotton-under-Edge (GB); Derek Marshall, Wotton-under-Edge (GB); John Charles Ould, Wotton-under-Edge (GB)

(73) Assignee: RENISHAW PLC, Wotton-Under-Edge (GB)

( * ) Notice: Subject to any disclaimer, the term of this patent is extended or adjusted under 35 U.S.C. 154(b) by 319 days.

(21) Appl. No.: 18/279,930

(22) PCT Filed: Mar. 1, 2022

(86) PCT No.: PCT/GB2022/050538
§ 371 (c)(1),
(2) Date: Sep. 1, 2023

(87) PCT Pub. No.: WO2022/185043
PCT Pub. Date: Sep. 9, 2022

(65) Prior Publication Data
US 2024/0142229 A1      May 2, 2024

(30) Foreign Application Priority Data

Mar. 5, 2021    (GB) ...................................... 2103105

(51) Int. Cl.
*G01B 5/008* (2006.01)
*G01B 21/04* (2006.01)
(52) U.S. Cl.
CPC ........... *G01B 21/047* (2013.01); *G01B 5/008* (2013.01); *G01B 2210/58* (2013.01)

(58) Field of Classification Search
CPC .............................. G01B 5/008; G01B 21/047
(Continued)

(56) References Cited

U.S. PATENT DOCUMENTS 4,145,816 A    3/1979  Stobbe et al.
4,153,998 A    5/1979  McMurtry
(Continued)

FOREIGN PATENT DOCUMENTS

JP          2006-522931 A    10/2006
JP          2014-134384 A    7/2014
(Continued)

OTHER PUBLICATIONS

May 25, 2022 International Search Report issued in International Patent Application No. PCT/GB2022/050538.
(Continued)

*Primary Examiner* — George B Bennett
(74) *Attorney, Agent, or Firm* — Oliff PLC

(57) ABSTRACT
A method of communicating information to a measurement probe mounted on a coordinate positioning machine includes encoding the information as one or more of a plurality of characteristic movements of the probe, controlling the machine to impart the movement(s) to the probe, detecting the movement(s) at the probe, and decoding the information at the probe from the detected movement(s). A measurement probe for use in such a method is mountable to the machine and includes at least one movement sensor for sensing movement imparted to the measurement probe by the machine, and a controller for determining whether the sensed movement includes one or more of the plurality of characteristic movements of the probe and for performing an operation at or controlling operation of the probe in dependence on the determination.

19 Claims, 13 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 4,599,524 | A | | 7/1986 | McMurtry |
| 5,056,235 | A | * | 10/1991 | Thomas ................. G08C 23/04 |
| | | | | 340/870.11 |
| 5,150,529 | A | | 9/1992 | Collingwood |
| 6,594,532 | B2 | * | 7/2003 | Mills ........................ G01B 7/28 |
| | | | | 33/549 |
| 6,951,060 | B2 | | 10/2005 | Groell |
| 7,145,468 | B2 | | 12/2006 | Collingwood et al. |
| 7,316,077 | B2 | | 1/2008 | Fuge et al. |
| 7,486,195 | B2 | | 2/2009 | Collingwood et al. |
| 7,812,736 | B2 | | 10/2010 | Collingwood et al. |
| 7,821,420 | B2 | | 10/2010 | Woollett et al. |
| 9,109,868 | B2 | | 8/2015 | Abe |
| 9,140,547 | B2 | | 9/2015 | Woollett et al. |
| 9,542,355 | B2 | * | 1/2017 | Somerville ............. G06F 15/00 |
| 9,869,538 | B2 | * | 1/2018 | Dolgikh ................. G01B 5/008 |
| 11,415,412 | B2 | * | 8/2022 | Buckingham .......... G01B 5/012 |
| 11,644,294 | B2 | * | 5/2023 | Adriano ................. G01B 5/008 |
| | | | | 702/168 |

| | | | |
|---|---|---|---|
| 2003/0179097 | A1 | 9/2003 | Collingwood et al. |
| 2004/0184415 | A1 | 9/2004 | Groell |
| 2006/0215614 | A1 | 9/2006 | Woollett et al. |
| 2006/0250266 | A1 | 11/2006 | Collingwood et al. |
| 2007/0068024 | A1 | 3/2007 | Fuge et al. |
| 2009/0140873 | A1 | 6/2009 | Collingwood et al. |
| 2011/0002361 | A1 | 1/2011 | Woollett et al. |
| 2016/0195382 | A1 * | 7/2016 | Mcmurtry .............. G01B 5/012 |
| | | | 33/503 |

FOREIGN PATENT DOCUMENTS

| | | |
|---|---|---|
| JP | 2018-103286 A | 7/2018 |
| WO | 02/063235 A2 | 8/2002 |
| WO | 2004/057552 A1 | 7/2004 |
| WO | 2004/090467 A1 | 10/2004 |

OTHER PUBLICATIONS

May 25, 2022 Written Opinion issued in International Patent Application No. PCT/GB2022/050538.
Nov. 19, 2021 Search Report issued in British Patent Application No. 2103105.9.

* cited by examiner logic "0"

+Z anticlockwise

−Z anticlockwise logic "1"

+Z clockwise

−Z clockwise

FIG. 14

|  | Switch On Method | Switch Off Method | Enhanced Trigger Filter and Spindle Orientation Capability | Optical Transmission Type | Optical Power Setting |
|---|---|---|---|---|---|
| 1 | Optical On (Standard) | Optical Off | Autoreset Off/Filter On (8ms) | Legacy (Start Filter Off) | Low Power |
| 2 | Optical On (3s Delay) | Short Timeout (12s) | Autoreset Off/Filter On (16ms) | Legacy (Start Filter On) | Standard Power |
| 3 |  | Medium Timeout (22s) | Autoreset On/Filter On (8ms) | Modulated (PROBE 1) |  |
| 4 |  | Long Timeout (134s) | Autoreset On/Filter On (16ms) | Modulated (PROBE 2) |  |
| 5 |  |  | Autoreset Off/Filter Off |  |  |

FIG. 15

| bit # | 0 | 1 | 2 | 3 | 4 | 5 | 6 | 7 | 8 |
|---|---|---|---|---|---|---|---|---|---|
| Function | Switch On Method | Switch Off Method | | Enhanced Trigger Filter and Spindle Orientation Capability | | | Optical Transmission Type | | Optical Power Setting |

FIG. 16A

| bit # | 0 | Function |
|---|---|---|
| Value | 0 | Optical On (Standard) |
| | 1 | Optical On (3s delay) |

FIG. 16B

| bit # | 1 | 2 | Function |
|---|---|---|---|
| Value | 0 | 0 | Optical Off |
| | 0 | 1 | Short Timeout (12s) |
| | 1 | 0 | Medium Timeout (22s) |
| | 1 | 1 | Long Timeout (134s) |

FIG. 16C

| bit # | 3 | 4 | 5 | Function |
|---|---|---|---|---|
| Value | 0 | 0 | 0 | Autoreset Off/Filter On (8ms) |
| | 0 | 0 | 1 | Autoreset Off/Filter On (16ms) |
| | 0 | 1 | 0 | Autoreset On/Filter On (8ms) |
| | 0 | 1 | 1 | Autoreset On/Filter On (16ms) |
| | 1 | 0 | 0 | Autoreset Off/Filter Off |

FIG. 16D

| bit # | 6 | 7 | Function |
|---|---|---|---|
| Value | 0 | 0 | Legacy (Start Filter Off) |
| | 0 | 1 | Legacy (Start Filter On) |
| | 1 | 0 | Modulated (PROBE 1) |
| | 1 | 1 | Modulated (PROBE 2) |

FIG. 16E

| bit # | 8 | Function |
|---|---|---|
| Value | 0 | Low Power |
| | 1 | Standard Power | machine                                          probe

FIG. 19A

| Step | Spin RPM | Action |
|---|---|---|
| 1 | 100 | TURN ON /OFF (operating mode) |
| 2 | 300 | ACQUISITION MODE |
| 3 | 500 | ANOTHER ACTION |

FIG. 19B

| Step | Spin Pattern | Action |
|---|---|---|
| 1 | CW or ANTI | TURN ON /OFF and look for following spins: |
| 2 | CW for 5s+ then ANTI for 5s+ | ACQUISITION MODE |
| 3 | ANTI for 5s+ then CW for 5s+ | ANOTHER ACTION |

FIG. 19C

| Step | Spin Pattern | Action |
|---|---|---|
| 1 | Spin at >100rpm | TURN ON /OFF and look or following spins: |
| 2 | Spin at 0 rpm for 0−5s | Wait for more spins |
| 3 | Spin at 100−200 rpm for >5s | ACQUISITION MODE |
| 4 | Spin at 300−400 rpm | ANOTHER ACTION |

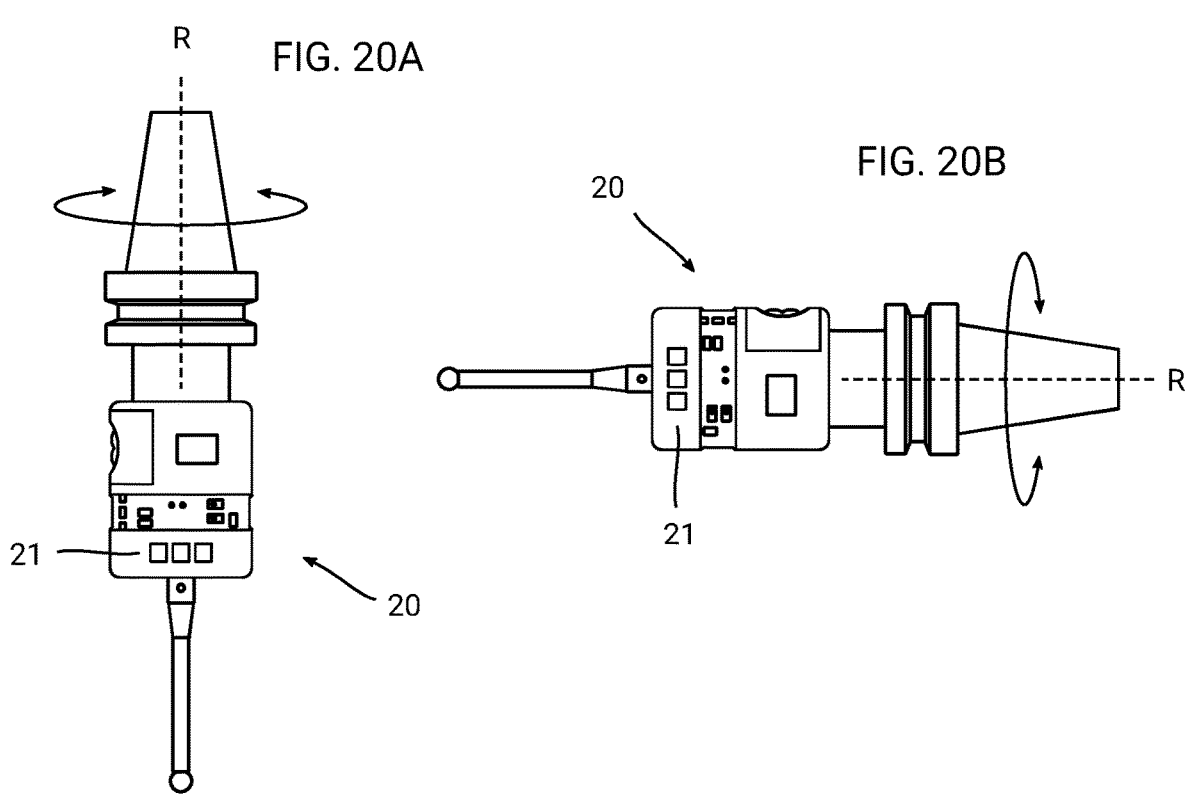

MEASUREMENT PROBE

The present invention relates to a measurement probe, such as a wireless measurement probe, for use on a coordinate positioning machine such as a machine tool, a coordinate measuring machine, a measuring robot, and the like. Examples of measurement probes are touch trigger probes and scanning or analogue probes. The present invention is also applicable to other types of measurement device, such as tool setters. The present invention also relates to a method of communicating information to such a measurement probe mounted on such a coordinate positioning machine.

Computer Numerically Controlled (CNC) machine tools are widely used in manufacturing industry for machining or cutting parts. With such machine tools, it is known to exchange a cutting tool for a measurement probe to enable parts or tools to be measured for set-up or inspection purposes. Such a measurement probe may be a contact probe having a workpiece-contacting stylus for measuring the position of points on the surface of a workpiece, such as described in U.S. Pat. Nos. 4,145,816 and 4,153,998. Rather than having a workpiece-contacting stylus, any of these types of probe may instead sense the workpiece using optical, capacitive, inductive (e.g. using eddy currents) or other non-contact techniques.

Since a measurement probe for use in machine tools is exchangeable with cutting tools, it can be difficult to provide wires or cables to connect the probe's output signal to the controller of the machine. Consequently, various wireless signal transmission techniques are typically used, including inductive transmission, optical transmission and radio transmission. An example of an optical transmission systems between the probe and the controller of the machine tool is shown in U.S. Pat. No. 5,150,529, while WO 2004/057552 provides an example of a wireless measurement probe that communicates with a remote probe interface over a spread spectrum radio link. Without wires or cables, the probe also needs to be battery powered.

As measurement probes have become more complex over the years, there has been a need for them to operate in different modes. For example, such measurement probes may include electronics to filter the signals they acquire, prior to transmitting these signals to the controller, in order to prevent the generation of spurious signals as a result e.g. of vibration. Therefore, the probe may have various modes of operation (e.g. filtering, or no filtering) and may be pre-set to use a different mode depending on the machine tool and the environment into which it has been installed. Since a wireless measurement probe for a machine tool is battery operated, the probe may also include various power saving modes to preserve battery life.

In addition, the wireless communications interface for the probe needs to be set up before wireless communication between the probe and the controller can even take place. For example, for a radio probe the frequency channels and communications protocols need to be set both at the probe and at the controller to ensure that they can talk to each other. However, before the mode of wireless communication has been established, it is not possible to use the wireless interface as a means of configuring the probe.

In known probes, such modes can be pre-set by the use of DIP switches on a circuit board internally within the probe. However, since the use of DIP switches has a number of disadvantages, WO 02/063235 describes an improvement in the form of a so-called "trigger-logic" technique that provides an easier way to program the mode of operation of a measurement probe. With this technique, indicators (e.g.

LEDs) on the measurement probe flash to indicate mode information and deflection of the probe stylus by hand is used to set the desired modes of probe operation.

However, although the "trigger logic" technique enables simple programming of the measurement probe without needing to access internal DIP switches or the like, the present applicant has found it can become complex when a large number of measurement probes need to be programmed or when the measurement probe has a large number of modes to set. This can lead to programming errors and can make the programming task time consuming.

According to a first aspect of the present invention, there is provided a method of communicating information to a measurement probe mounted on a coordinate positioning machine, comprising encoding (and/or representing) the information as (e.g. by selecting from) one or more of a (e.g. predetermined) plurality of (e.g. available or selectable) characteristic (and/or distinct and/or identifiable and/or distinguishable) movements of the probe, controlling the machine to impart the movement(s) to the probe, detecting the movement(s) at the probe, and decoding (and/or determining and/or reconstructing) the information at the probe from the detected movement(s).

This has the advantage that an existing mechanism (i.e. movement of the machine) can be used, rather than a separate communications channel which may not yet be configured. Furthermore, because of the availability of a plurality of characteristic movements from which to select when encoding the information, a rich variety of information can be represented and communicated in this way. For example, a combination or sequence of movements selected from the available characteristic movements can be used to form a complex set of instructions for the probe or to communicate or initiate communication of configuration data.

According to a second aspect of the present invention, there is provided a measurement probe for use in a method according to the first aspect of the invention, the measurement probe being mountable to the machine and comprising: at least one movement sensor for sensing movement imparted to the measurement probe by the machine; and a controller for determining whether the sensed movement comprises one or more of the plurality of characteristic movements of the probe, and performing an operation at or controlling operation of the probe in dependence on the determination.

The information may be encoded or represented as a sequence of two or more of the plurality of characteristic movements.

A characteristic movement of the probe (or a sequence of such characteristic movements) may be one that is not a normal movement or sequence of movements that the probe would make during normal operation (for example when measuring a workpiece, or when being moved around the working volume, or when being moved to or from a tool changer rack). For example, a rotation around a longitudinal axis of the probe would not typically be a movement which is made during normal operational use of the probe.

A characteristic movement need not be specified in all respects, but can instead relate to a characteristic type or range of movement. For example, a clockwise rotation at any rotational speed might be used as a characteristic movement because it can be distinguished from an anticlockwise rotation at any rotational speed. Therefore, two movements or types of movements can be considered as characteristic movements if they can be distinguished from one another (particularly at the probe, using suitable movement sensors). However, a clockwise rotation in a range between 100 and 300 rpm would not constitute a characteristic movement relative to a clockwise rotation in a range between 200 and 400 rpm because the overlapping ranges (in the same rotation direction) mean that these movements cannot be distinguished (at the probe) from the other. So, the property of being a characteristic movement can be considered to be relative to another movement or type of movement.

The method may comprise performing an operation at or controlling operation of the probe in dependence on the information decoded at the probe.

The information may comprise at least one of: (a) configuration data for the probe; and (b) one or more commands or operations or instructions to be performed by the probe.

The method may comprise using one or more movements as a command or instruction to put the probe into a data reception mode, during which mode one or more further movements may be used to communicate data to the probe.

The method may comprise using one or more movements as a command or instruction to put the probe into a data transmission mode, during which mode the probe may communicate data to a machine controller or interface of the machine.

The probe may communicate the data to the machine controller or interface using a sequence of trigger pulses.

The data may comprise probe configuration data.

The method may comprise using the data received at the probe to configure the probe.

The step of encoding (or representing) the information may comprise selecting one or more movements representing (or corresponding to) the information from a plurality of predetermined characteristic movements.

The predetermined characteristic movements may be stored in a lookup table.

The predetermined characteristic movements may be presented in an instruction manual, for example a user instruction manual.

The step of encoding (or representing) the information may comprise using a predetermined algorithm (e.g. encoding algorithm) to encode or convert the information into a corresponding set or sequence of one or more movements to be performed by the probe. The algorithm may be adapted such that different information (with different information content) is encoded into a different set or sequence of one or more movements to be performed by the probe. In this way, the different information (with different information content) can be distinguished at the probe. The algorithm may be adapted to receive more than one type of information (e.g. more than one command to be communicated to the probe) and to encode different type of information (e.g. different commands) into different respective movement(s) to be performed by the probe.

The method may be adapted to handle more than one type or item of information (for example different commands to be performed by the probe or different configuration data for the probe), and to encode different types or items of information (for example different commands or configuration data) into different corresponding respective movement(s) of the probe.

The one or more movements may comprise at least one rotational movement of the probe and/or at least one translational movement of the probe.

The or each movement may be a rotational movement of the probe.

The method may comprise using (e.g. signals from) at least one movement sensor on the probe to detect the one or more movements.

The method may comprise using (e.g. signals from) at least one movement sensor on the probe to distinguish between different movements of the one or more movements.

The method may comprise using (e.g. signals from) at least one movement sensor on the probe to distinguish between the one or more movements and other movements of the probe (e.g. normal movements made during normal use of the probe).

The at least one movement sensor may comprise at least one accelerometer.

The at least one movement sensor may comprise at least one linear accelerometer.

The method may comprise using (e.g. signals from) at least two accelerometers on the probe, arranged substantially orthogonal to one another, to detect the movement(s) and/or to distinguish those movement(s) from other movements of the probe.

The method may comprise using (e.g. signals from) at least three accelerometers on the probe, arranged substantially orthogonal to one another, to detect the movement(s) and/or to distinguish those movement(s) from other movements of the probe.

The probe may comprise at least one of: an axial accelerometer for measuring acceleration along an axis of the probe; and first and second radial accelerometers for measuring acceleration respectively in first and second substantially orthogonal radial directions towards the probe axis (such as is caused by rotation of the probe around the probe axis).

The machine may be operable to rotate the probe around a rotational axis of the machine.

The movement(s) may comprise at least one rotational movement about the rotational axis of the machine.

The probe may be mounted on the machine with the probe axis substantially aligned with the rotational axis of the machine.

The machine may comprise an articulating probe head to which the probe is mounted. The rotational axis of the machine may be selected from one or more rotational axes of the probe head.

The or each of the movement(s) may be distinguishable by the probe from each other of the movement(s).

The or each of the movement(s) may be distinguishable by the probe from other movements made by the probe.

The or each of the movements may be characterised by (and/or distinguishable from each other of the movements) by one or more of: (a) a property of the movement, such as its speed and/or duration; (b) a type of the movement, such as whether it is a clockwise or anticlockwise rotation; (c) a magnitude of acceleration; (d) a direction of acceleration; (e) a speed or velocity of the movement; (f) a direction of the movement; (g) a duration of the movement; (h) a timing of movement; (i) the order of the movement within a sequence of movements; and (j) a temporal relationship between the movement and one or more other movements within a sequence of movements. Whether or not one movement or type of movement is distinguishable from another movement or type of movement is particularly relevant from the perspective of the probe, which is where the detection, identification and analysis of movements takes place. It is also noted that a movement can be characterised by a range of property values (such as a rotation speed between 100 and 200 rpm or a rotation speed greater than 300 rpm or a duration between 3 and 7 seconds) rather than by a specific value of a property (e.g. a rotation speed of exactly 100 rpm) though in practice even a specific property value would typically amount to a small range of values due to measurement and motion control tolerances.

Movement may comprise rotational and/or translational movement.

There may be a plurality of different movements or combinations of movements from which to choose or select in the encoding or representing step, with each corresponding to a different respective operation to be performed by the probe.

Each movement or combination of movements may correspond to a different respective identifiable signature.

The method may comprise mounting the measurement probe on the machine before controlling the machine to impart the one or more movements to the probe.

The decoding step performed at the probe may be based only on movement(s) detected at the probe after the probe has been mounted on the machine, or at least account may be taken only of information derived from movement(s) which are detected at the probe after the probe has been mounted on the machine. This is to be distinguished from a scenario where movements imparted e.g. by a manual operator when mounting the probe on the machine tool changer might trigger the probe to turn on or be accidentally configured.

The measurement probe may be a wireless measurement probe.

The measurement probe may be adapted for measuring the position of points on the surface of an object. The measurement probe may be a contact probe having a deflectable stylus. The sensor may then measure deflection of the stylus. The measurement probe may be a non-contact probe (e.g. an optical, inductive or capacitive probe). The measurement probe may be a touch trigger probe. The measurement probe may be a scanning or analogue probe. The measurement probe may be configured for measuring a workpiece. For example, the measurement probe may comprise a shank that allows it to be mounted in the spindle of a machine tool; i.e. it may comprise a spindle-mountable measurement probe. The measurement probe may be mountable elsewhere on the machine tool.

A measurement probe may also be referred to as a dimensional measurement probe, or a probe for sensing the position of (one or more points on) an object.

The measurement probe may be a measurement device, such as a measurement probe or a tool setter. In this way, the first aspect of the present invention is applicable to any type of measurement device. The tool setter may be an optical tool setter (for example, a non-contact laser tool setter). The tool setter may be mounted to the bed of the machine tool.

The measurement probe may be battery operated (e.g. it may include one or more internal batteries for powering the control circuitry, primary wireless communications module etc.).

The coordinate positioning machine may be a machine tool.

The rotational axis of the machine may be a rotational axis of a spindle of the machine tool.

The probe may be mounted on the machine tool with the probe axis substantially aligned with a spindle axis of the machine tool.

The method of communicating information to the probe may provide a secondary means of communication, there also being a primary means of communication different from the secondary means of communication, with the primary means of communication being used to communicate during normal use of the probe, for example for communicating measurement data during a measurement operation.

The primary means of communication may comprise a wireless means of communication, such as optical or radio.

The probe movement(s) may be considered to be characteristic (or distinct or identifiable) if each (e.g. rotational) movement is distinguishable by the probe from each other (e.g. rotational) movement.

According to a third aspect of the present invention, there is provided a method of controlling a measurement probe mounted on a coordinate positioning machine, comprising communicating information to the probe using a method according to the first aspect of the present invention, and performing an operation at or controlling operation of the probe in dependence on the decoded information.

According to a fourth aspect of the present invention, there is provided a measurement probe configured to use a method according to the first aspect of the present invention.

According to a fifth aspect of the present invention, there is provided a machine controller configured to use a method according to the first aspect of the present invention.

According to a sixth aspect of the present invention, there is provided a computer program which, when run by a computer or a machine controller or a probe controller, causes the computer or machine controller or probe controller to perform or at least use a method according to the first aspect of the present invention. The program may be carried on a carrier medium. The carrier medium may be a storage medium. The carrier medium may be a transmission medium.

According to a seventh aspect of the present invention, there is provided a computer-readable medium having stored therein computer program instructions for controlling a computer or machine controller or probe controller to perform a method according to the first aspect of the present invention.

According to another aspect of the present invention, there is provided a method of communicating information to a measurement probe mounted on a coordinate positioning machine, comprising selecting one or more of a plurality of characteristic movements of the probe in dependence on the information, controlling the machine to impart the movement(s) to the probe, detecting the movement(s) at the probe, and determining or reconstructing the information at the probe from the detected movement(s).

According to another aspect of the present invention, there is provided a method of communicating with a measurement probe mounted on a coordinate positioning machine (with the machine operating under control of a machine controller), the method comprising encoding (or representing) information (at the controller) to be communicated to the probe as a sequence of two or more (distinct and/or identifiable and/or characteristic) movements of (to be performed by) the probe, controlling (using the controller to control) the machine to perform the sequence movements on (impart the sequence of movements to) the probe, detecting the sequence of movements at the probe, and decoding (or determining) the information from the detected sequence of movements at the probe.

According to another aspect of the present invention, there is provided a method of communicating with a measurement probe mounted on a coordinate positioning machine, the method comprising controlling the machine to perform a sequence of two or more different (rotational) movements of the probe, and detecting this sequence of movements at the probe.

According to another aspect of the present invention, there is provided a method of communicating with a measurement probe mounted on a coordinate positioning machine, the method comprising representing (encoding) information to be communicated to the probe as a sequence of two or more distinct movements of (to be performed by) the probe, controlling the machine to impart the sequence of movements to (or on) the probe, detecting the sequence of movements at the probe, and extracting (decoding) the information at the probe from the detected sequence of movements.

According to another aspect of the present invention, there is provided a method of controlling operation of a measurement probe mounted on a coordinate positioning machine, the method comprising (communicating with the probe by) controlling the machine to perform a sequence of two or more different (rotational) movements of the probe, detecting this sequence of movements at the probe, and controlling operation of the probe based on the detected sequence.

Reference will now be made, by way of example, to the accompanying drawings, in which.

Figure 1:
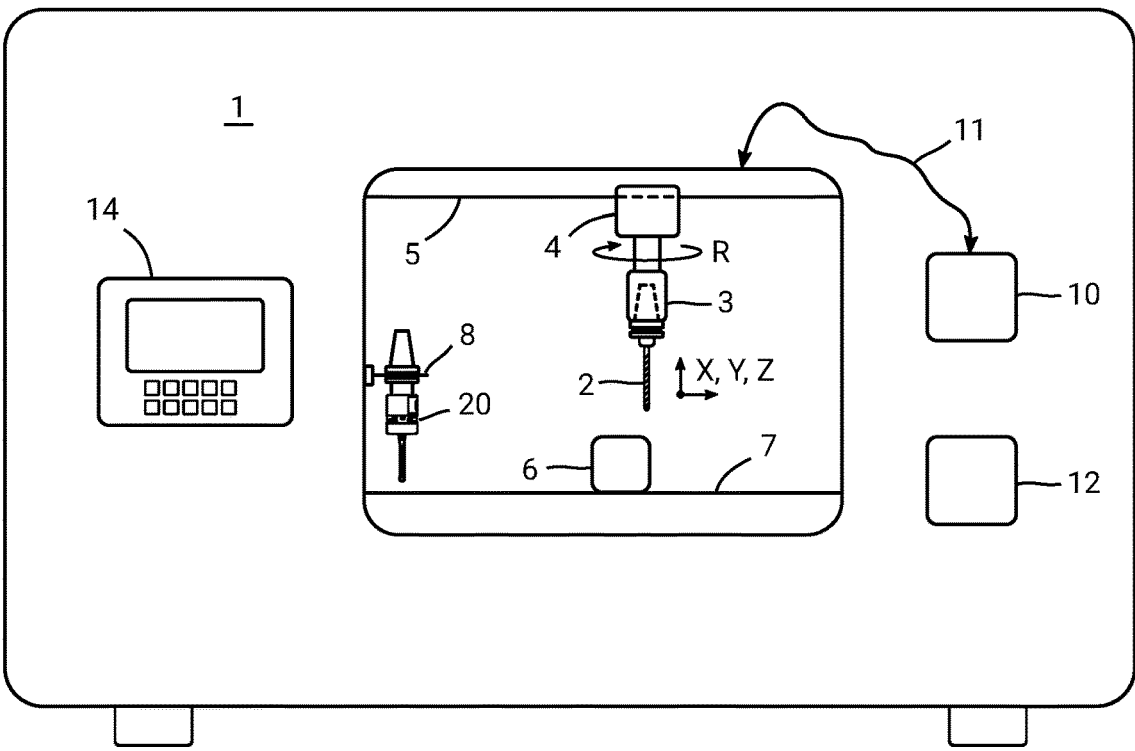
FIG. 1 is a schematic illustration of a machine tool embodying the present invention, with a drill bit being used to perform machining operations on a workpiece.
Figure 2:
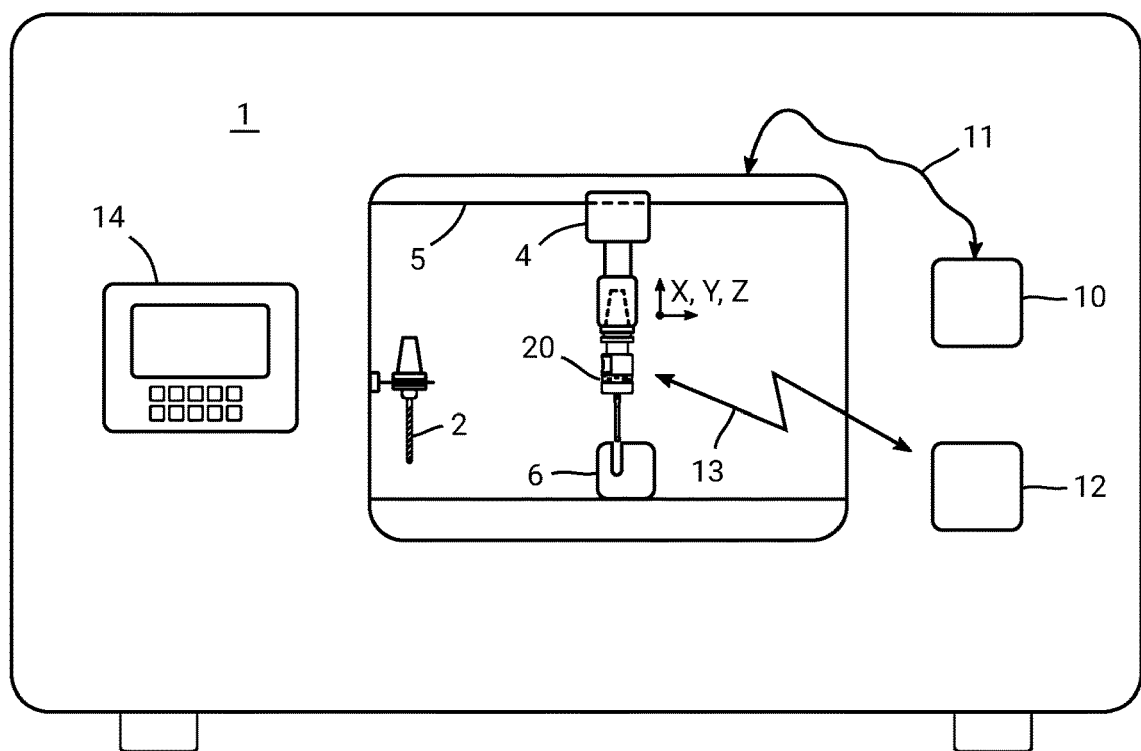
FIG. 2 shows the machine tool of FIG. 1 having swapped a drill bit for a measurement probe for performing measurement operations on the workpiece.
Figure 3:
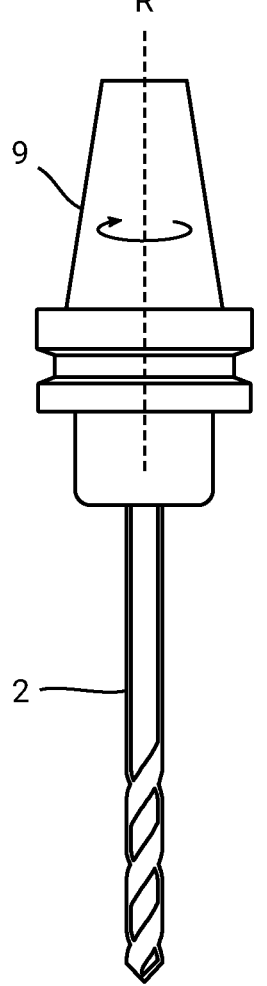
Figure 4:
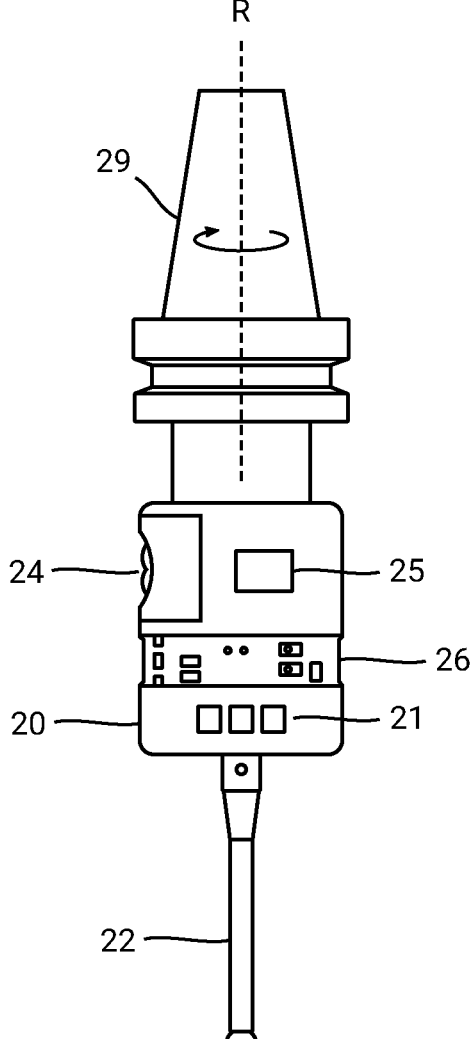
Figure 5:
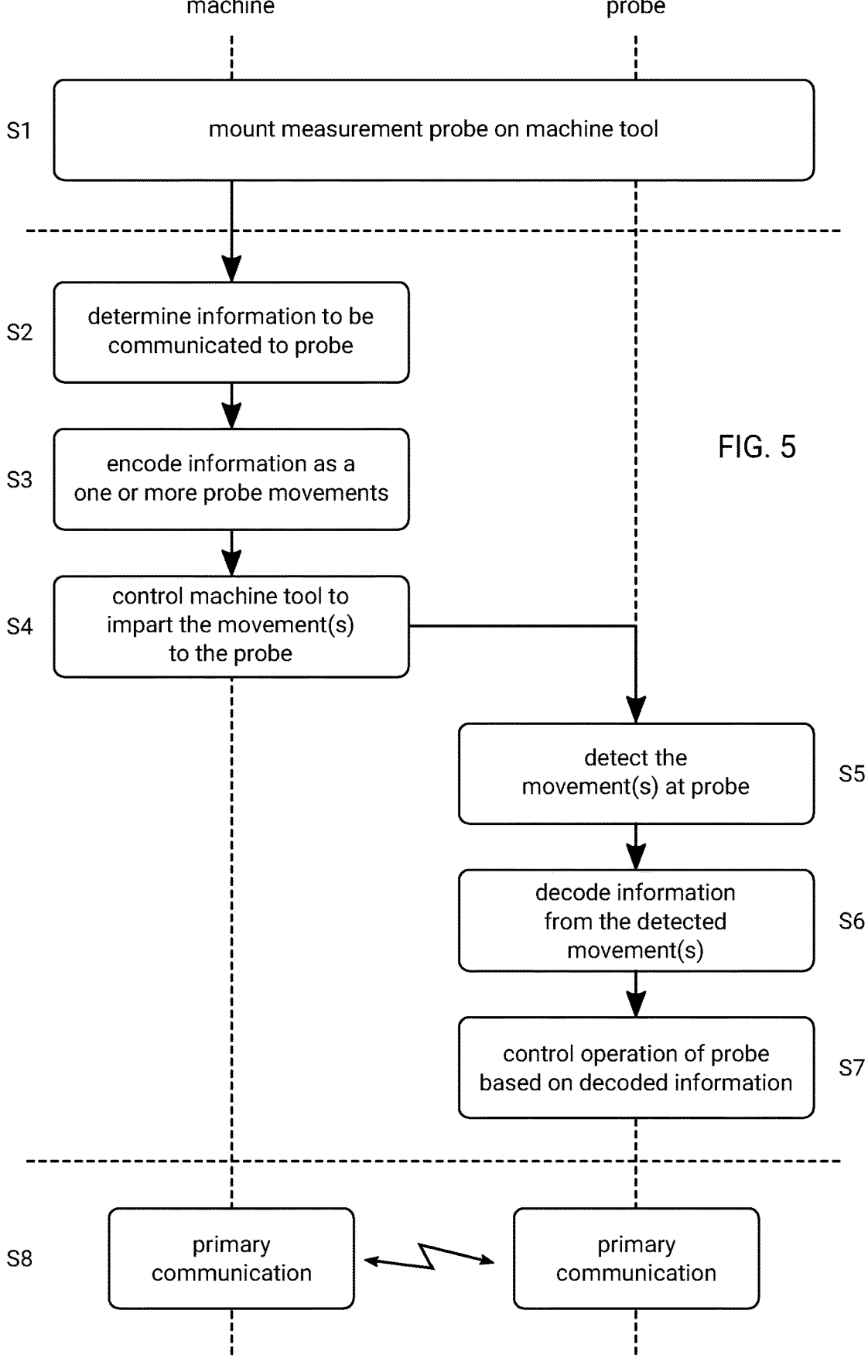
Figures 12A, 12B, 12C:
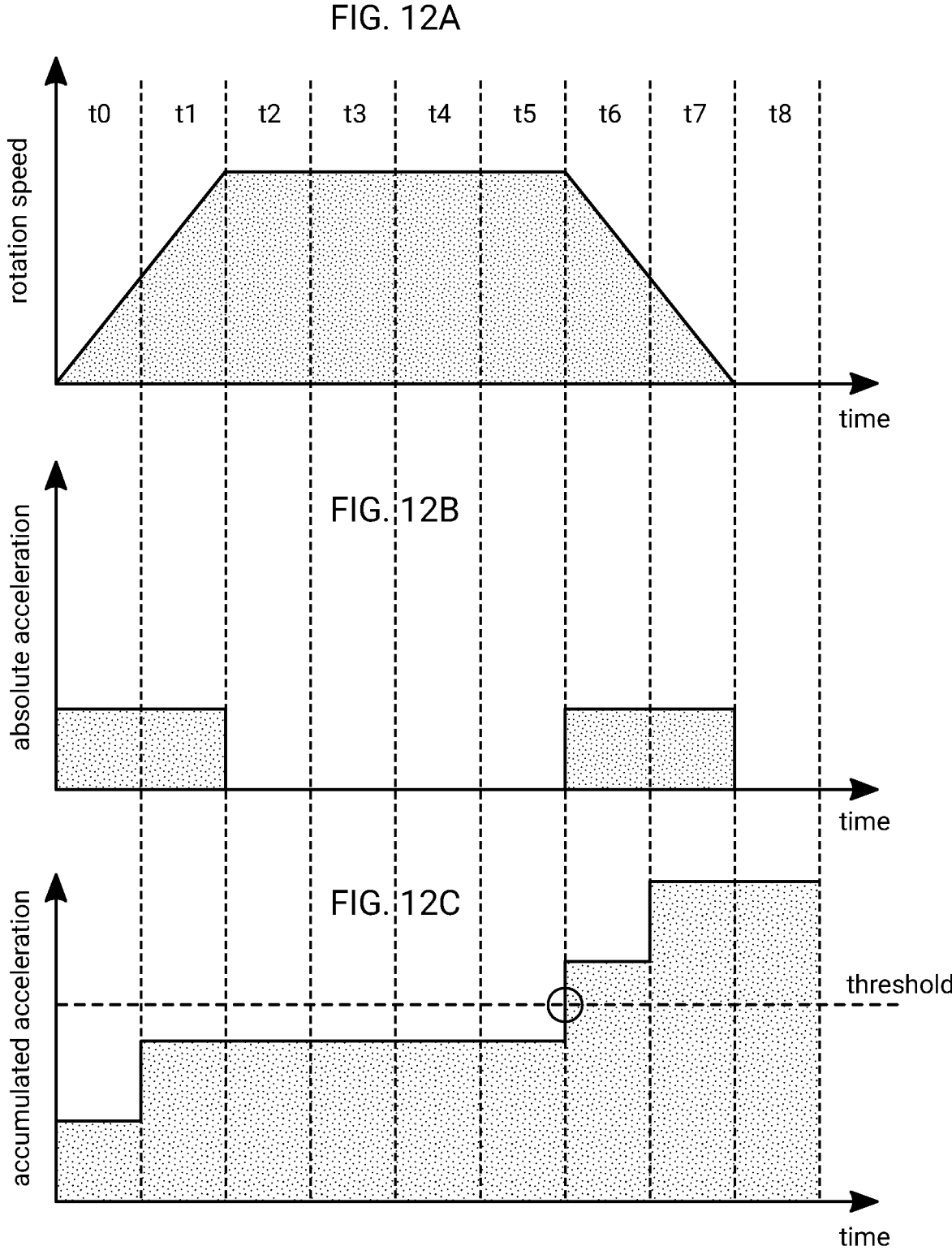
Figure 13:
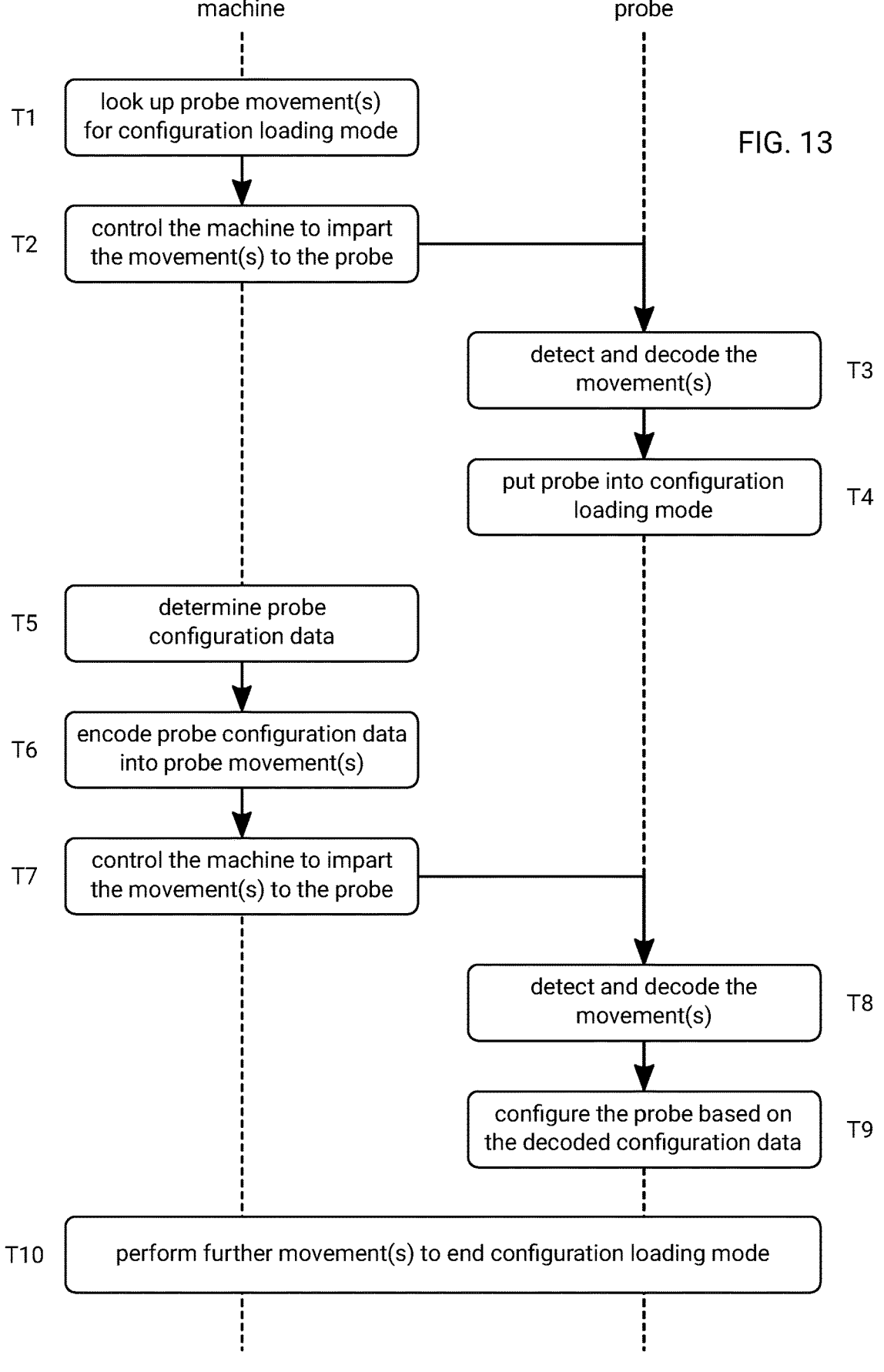
Figure 17:
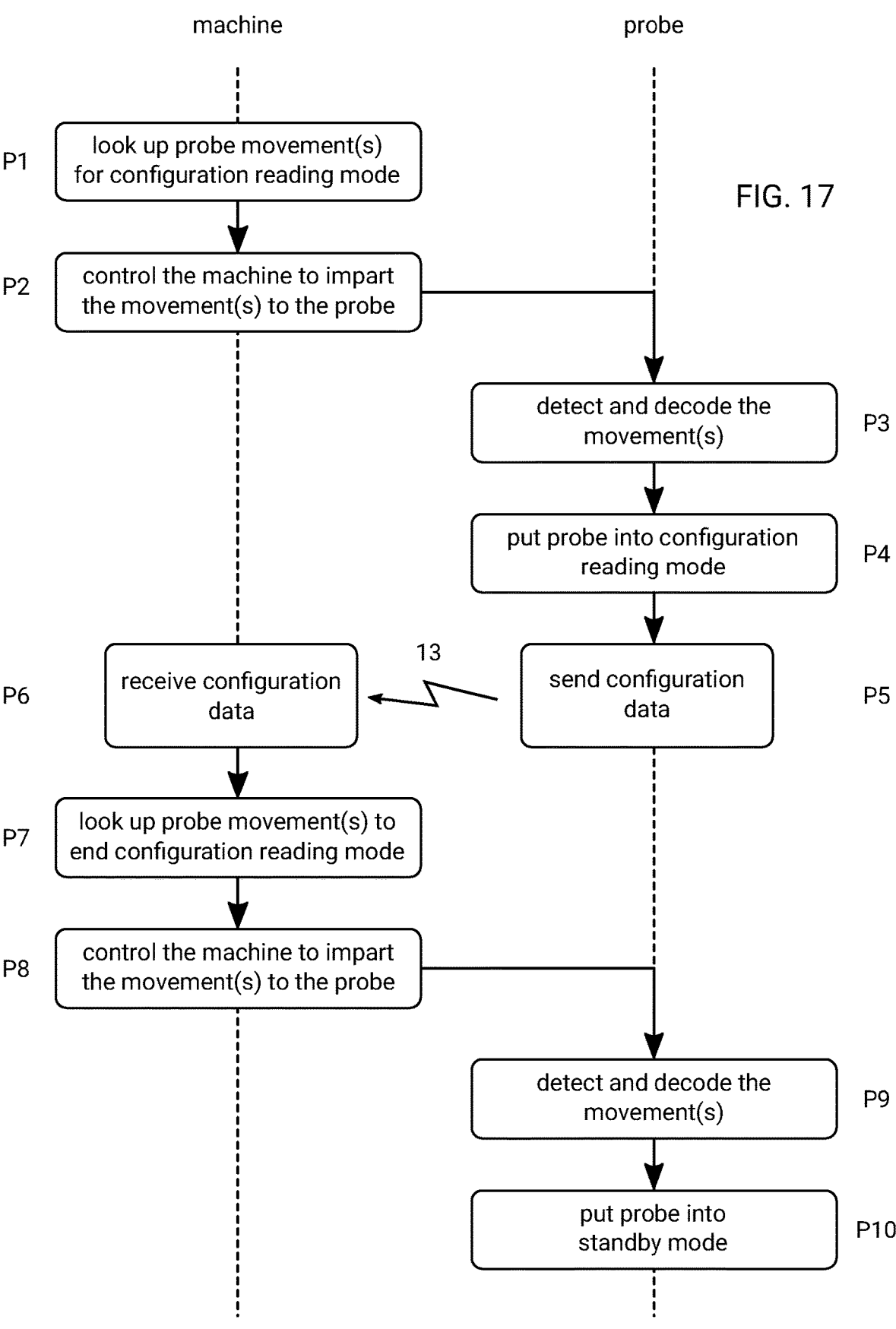
Figure 18:
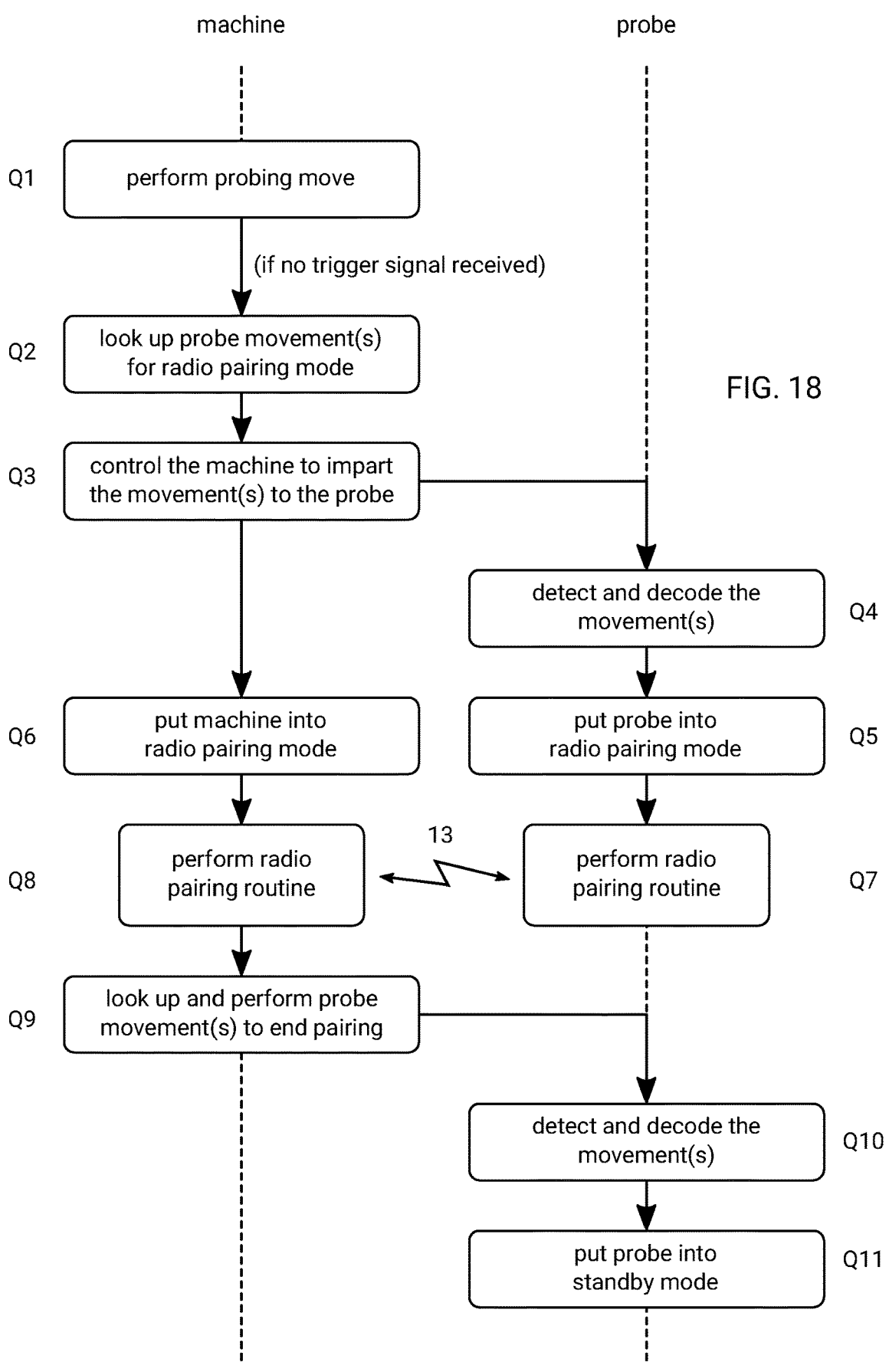

FIG. 3 provides a more detailed illustration of the drill bit of FIGS. 1 and 2;

FIG. 4 provides a more detailed illustration of the measurement probe of FIGS. 1 and 2;

FIG. 5 is a schematic illustration of a method embodying the present invention for communicating information to a measurement probe mounted on a coordinate positioning machine;

FIGS. 6 to 11 illustrate various different possibilities for the characteristic movements of the probe that can be used to encode information;

FIGS. 12A to 12C illustrate how a movement can be characterised by accumulated acceleration;

FIG. 13 is a flowchart to illustrate a method embodying the present invention for putting the probe into a configuration loading mode and for communicating configuration data to the probe;

FIG. 14 provides a table showing various functions of the probe that can be configured in the configuration loading mode, along with the possible configuration options that are available for each function;

FIG. 15 provides a table showing a scheme for encoding configuration data for the functions of FIG. 14 into a series of nine bits, with the different functions each being allocated to one or more different bit positions;

FIGS. 16A to 16E provide tables corresponding respectively to the functions of FIG. 14, with each table showing the bit position values for each possible option associated with that function;

FIG. 17 is a flowchart to illustrate a method embodying the present invention for putting the probe into a configuration reading mode and for subsequently ending configuration reading mode;

FIG. 18 is a flowchart to illustrate a method embodying the present invention for putting the probe into a radio pairing mode;

FIGS. 19A to 19C provide tables showing further sequences of characteristic movements that might be performed; and FIGS. 20A and 20B show a probe mounted in a vertical and horizontal machine tool spindle respectively.

FIG. 1 is a schematic illustration of a machine tool 1 embodying the present invention, which would typically be installed in a factory or machine shop environment. The machine tool 1 is for performing machining operations on a workpiece 6, which is illustrated in FIG. 1 as being loaded onto a base or bed 7 of the machine tool 1. The machine tool 1 comprises a spindle 3, into which a drill bit 2 for performing machining operations on the workpiece 6 is mounted. The spindle 3 is in turn supported by a support member 4 which is itself moved by a movement system 5, thereby enabling the drill bit 2 to be moved into position for working on the workpiece 2. The movement system 5 would typically provide for movement of the drill bit 2 in three degrees of freedom (along three axes) X, Y, Z, and the spindle 3 is controllable to rotate rapidly around its longitudinal axis R in order to cause the drill bit 2 to machine a feature in workpiece 2.

The movement system 5 is controlled by a machine controller 10, and these elements are connected via communications link 11, which is typically a wired connection. Separately, the machine also comprises a probe interface 12, which will be discussed below, and a user interface 14 which is used by the operator to set up and program the machine tool 1 (for example the machine controller 10). To the left side of the window of the machine tool 1 shown in FIG. 1 is a tool holder or rack 8, which is shown holding a measurement probe 20. After the machine tool 1 has finished working on the workpiece 6, or has finished working on a particular feature of the workpiece 6, the machine controller 10 can be used to perform a series of movements which results in the drill bit 2 of FIG. 1 being interchanged with the measurement probe 20.

After such a tool change operation to swap the drill bit 2 for the measurement probe 20, as shown in FIG. 2, the machine tool 1 can then be controlled to perform a measurement operation on the workpiece 6 to inspect it and to check that any machined features are within tolerance. During the measurement operation, the spindle 3 and the attached measurement probe 20 would not typically be rotated around its longitudinal axis, because such a movement is not typically required or desirable. During the measurement operation the measurement probe 20 communicates with the probe interface 12 over a separate communications link 13 (for example a radio or optical communications channel), for example to send commands to the probe 20 and/or to receive measurement data from the measurement probe 20; this can be considered to the a primary communications channel for the measurement probe 20. Following the measurement operation, if there is further work to be performed on the workpiece 6 then the measurement probe 20 can be swapped for the drill bit 2 (or some other tool held in the tool rack 8) for further machining or processing operations.

FIG. 3 provides a more detailed illustration of the drill bit 2 of FIGS. 1 and 2, showing in particular a shank 9 that is adapted to couple with the spindle 3 of the machine tool 1 using a standard releasable shank connector. The longitudinal rotation axis R is also shown in FIG. 3. FIG. 4 provides a more detailed illustration of the measurement probe 20 of FIGS. 1 and 2, also having a shank 29 that is adapted similarly to couple with the spindle 3 of the machine tool 1 using the standard releasable shank connector. Although, as mentioned above, probe 20 is not typically rotated during normal use (e.g. during a measurement operation), the longitudinal rotation axis R is also shown in FIG. 4 because this is relevant further below when describing a method of communicating information embodying the present invention. Since the measurement probe 20 illustrated in FIG. 4 is battery powered, it also comprises a battery compartment 24 into which a battery can be inserted. The measurement probe 20 in this example is a touch trigger type probe and accordingly comprises a workpiece-contacting stylus 22. Finally, the measurement probe 20 has an annular window 26 through which optical signals can be transmitted to and received from the probe interface 12 over the wireless communications link 13 illustrated in FIG. 2; this can be considered to the a primary communications channel for the probe 20. The elements illustrated schematically within the window 26 are the optical transmitters and receivers, and associated exposed electronic components. Also illustrated schematically in the probe 20 of FIG. 4 are one or more movement sensors 21 for sensing movement imparted to the measurement probe 20 by the machine 1, and a controller 25 for determining whether the sensed movement comprises one or more of the plurality of characteristic movements, and performing an operation at or controlling operation of the probe 20 in dependence on the determination.

FIG. 5 is a schematic illustration of a method embodying the present invention for communicating information in general to a measurement probe (such as measurement probe 20 of FIGS. 1 and 2) mounted on a coordinate positioning machine (such as machine tool 1 of FIGS. 1 and 2). More specific embodiments will be described further below.

In step S1, the measurement probe 20 is mounted in the spindle 3 of the machine tool 1, as described above. In step S2 it is determined what information is to be communicated to the measurement probe 20. As will be described in more detail below, this information could be configuration data for the measurement probe 20, or it could be a command for putting the measurement probe 20 into a particular operating mode, or indeed any information whatsoever.

In step S3 the information is encoded as one or more of a plurality of characteristic movements of the probe 20. For example, there may be a lookup table comprising a plurality of different characteristic movements of the probe 20, and step S3 would comprise selecting one or more of those characteristic movements based on the information that is to be sent. In this way, the selected characteristic movements are a representation of the information to be sent. This will become more apparent in the specific embodiments described below.

In step S4 the machine tool 1 is controlled to impart the movement(s) determined in step S4 to the probe 20, for example by using the movement system 5 and/or by rotating the spindle 3 around the rotational axis R, as described above with reference to FIGS. 1 to 4.

In step S5, these movement(s) are detected at the probe 20 by movement sensors 21, and in step S6 the information is decoded or extracted by the probe controller of the probe 20 from the movement(s) detected in step S5. Having decoded the information sent from the machine controller 10 by way of these movement(s), the decoded information is used at the probe 20 appropriately (based on what the information represents), for example to control some aspect of the operation of the probe 20 if the information represents configuration data or a command which is intended to change an operational mode of the probe 20.

Finally, step S8 represents the measurement probe 20 using the primary communications channel 13 to communicate with the probe interface 12, for example having configured or established or initiated this primary communications channel 13 using the method of steps S1 to S7.

Figures 6, 7:
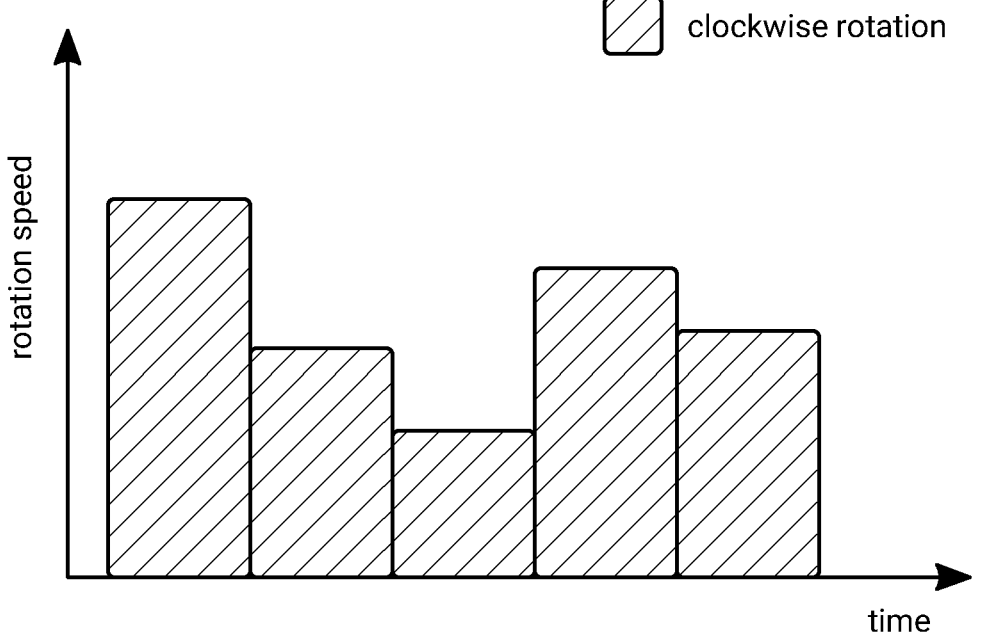

Various possibilities for the characteristic movements of the probe 20 will now be described with reference to FIGS. 6 to 11. Each of the plurality of possible characteristic movements should be distinguishable by the probe 20 from each of the other characteristic movements. For example, FIG. 6 shows a sequence of rotational movements performed by the probe 20, each of which is in a clockwise direction for the same duration, but at different respective rotational speeds. As such, each of these movements can be described as a characteristic movement because each movement is distinguishable from each other movement by virtue of the rotational speed, which is detectable at the probe 20 by appropriate movement sensors. A characteristic movement in this context can also be considered to be an individual one of the rotational movements of FIG. 6, or a combination of movements (for example a signature sequence consisting of all five rotations shown in FIG. 6, in that order and with those rotational speeds).

FIG. 7 shows a different sequence of rotational movements performed by the probe 20, each of which is in a clockwise direction, but for different respective durations and at different respective rotational speeds. As such, each of these movements (or a combination of such movements) can be described as a characteristic movement because each movement is distinguishable from each other movement by virtue of both the duration and the rotational speed, both of which are measurable at the probe 20.

Figure 8:
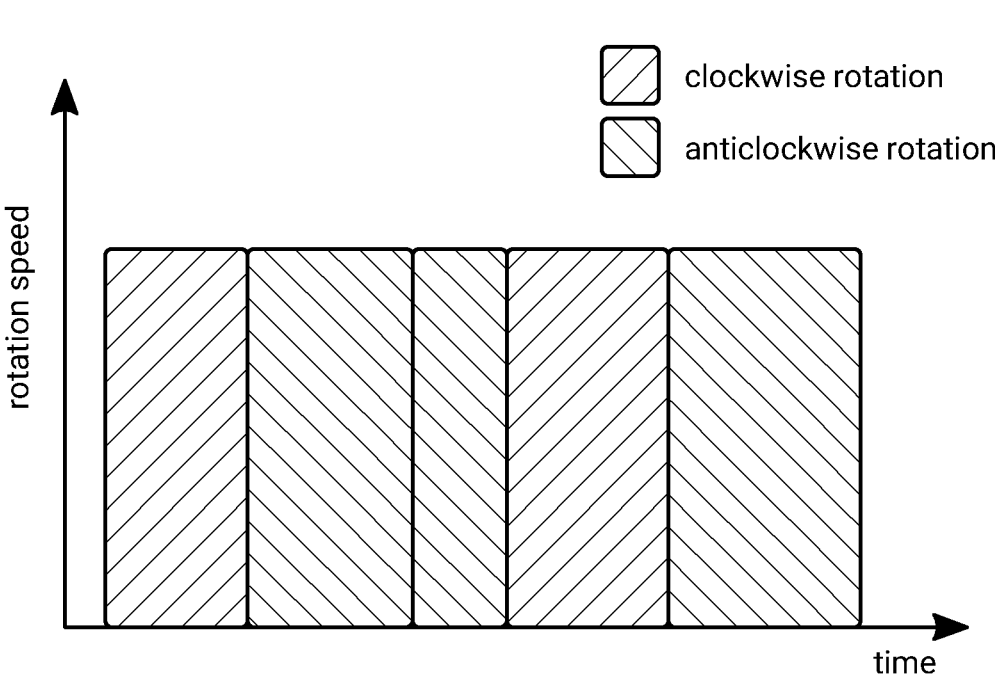

FIG. 8 shows another sequence of rotational movements performed by the probe 20, each of which at the same rotational speed, but in different respective directions (some clockwise, some anticlockwise) and for different respective durations. As such, each of these movements (or a combination of such movements) can be described as a characteristic movement because each movement is distinguishable from each other movement by virtue of both the duration and the rotational direction, both of which are measurable at the probe 20.

Figure 9:

FIG. 9 shows another sequence of rotational movements performed by the probe 20, at different respective rotational speeds, rotational directions and durations. As such, each of these movements (or a combination of such movements) can be described as a characteristic movement because each movement is distinguishable from each other movement by virtue of the rotational speed, rotational direction and duration, all of which are measurable at the probe 20.

Figures 10, 11:
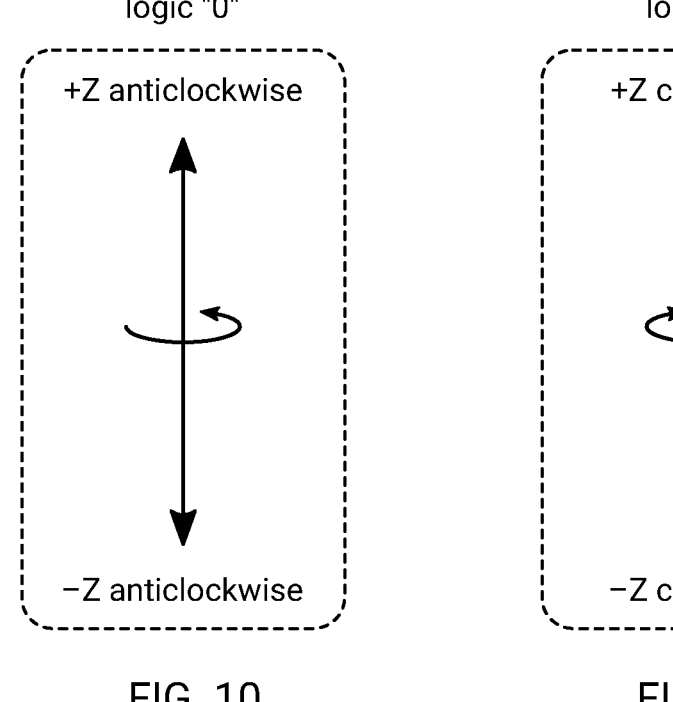

A characteristic movement can also be a rotational movement combined with a translational movement of the probe 20, as illustrated in FIGS. 10 and 11. In FIG. 10, an anticlockwise rotation combined with a movement (acceleration) in the Z direction (in either direction) is used to encode an information bit '0', while in FIG. 11 a clockwise rotation combination with a movement in the Z direction (in either direction) is used to encode an information bit '1'. In this way, a sequence of such characteristic movements can be used to convey a series of logic bits, which can be used to represent any data that needs to be communicated to the probe 20. The bit periods could be of a fixed duration or could be separated by null periods of zero movement.

A movement of the probe 20 can also be characterised at least in part by its linear and/or rotational acceleration (in contrast to its linear and/or rotational speed). For example, when considering the Z movement of FIGS. 10 and 11, this movement in Z could be characterised by its linear acceleration rather than its linear speed. Movement of the machine in the Z direction (which is imparted to the probe 20) would in practice consist of an acceleration phase followed by a deceleration phase as shown in FIG. 12A. It is not practical for the machine tool 1 to provide extended periods of high acceleration, since the velocity of the accelerated machine components (including the probe 20) would end up becoming too great. One possible implementation would be to take the absolute output of the linear accelerometer for the Z axis, which is shown in FIG. 12B, and for each of the bit periods to derive a cumulative or accumulated acceleration, as shown in FIG. 12C. When the accumulated acceleration of FIG. 12C reaches a predetermined threshold (as marked in FIG. 12C), then the movement is determined to be a characteristic Z movement in the context of FIGS. 10 and 11. In this way, high accelerations of machine components can be avoided.

In each of the examples shown in FIGS. 6 to 11, modulation of angular velocity (rotation) is used to characterise the different movements of the probe 20. For the examples shown in FIGS. 10 and 11, modulation of angular velocity (rotation) is combined with modulation of linear acceleration modulation (in the Z direction).

In summary, the or each of the movement(s) performed by the probe 20 may be distinguishable from each other of the movement(s) by one or more of: (a) magnitude of acceleration; (b) direction of acceleration; (c) speed of movement; (d) direction of movement; (e) duration of movement; (f) timing of movement; and (g) order of movement within a sequence of movements. Movement may comprise rotational and/or translational movement.

A characteristic movement should also preferably be readily distinguishable by the probe 20 from other movements made by the probe 20 during normal operation, such as translational movements around the working volume of the machine tool 1. For this reason, it is preferable to use rotation around the longitudinal axis R of the probe 20 to form at least part of a characteristic movement, since this is not a type of movement that would normally be imparted to the probe 20 during normal operational use (except in specific circumstances such as for a measurement cycle in which the probe 20 might e.g. be rotated to deal with stylus runout). However, this is not essential so long as the movements can be distinguished from normal operational movements in some way. A movement (or acceleration) in the Z direction is chosen for the characteristic movements shown in FIGS. 10 and 11 because some machine tools move the machine table 7 (and workpiece 6) in X and Y rather than the support 4, with the movement system 5 only moving the support 4 (and spindle 3) in a Z direction, and since the idea would ideally work consistently on multiple machine tools 1 with differing acceleration profiles, complex signatures would not be possible. However, it is also possible where appropriate to use translational movements or accelerations in X and Y to characterise (at least partly) a characteristic movement of the probe 20.

In a simple case, performing one or more of the characteristic movements described above for the probe 20 can be used to initiate a single corresponding function at the probe, such as switching the probe 20 into a different operational mode, with a plurality of different operational modes being selectable by using different characteristic movements to convey different respective commands to the probe 20. For example, a user manual for the measurement probe 20 could teach rotating the probe 20 at 600 rpm (revolutions per minute) for 20 seconds to enter mode A, rotating the probe 20 at 1200 rpm for 20 seconds for mode B or rotating the probe 20 at 1200 rpm for 40 seconds for mode C. The user would then enter a line of code (or a pair of speed/duration variables) for the desired mode (A, B or C) into the machine controller 10 (using the interface 14) that commands the machine tool 1 to rotate the probe 20 at the given speed and for the given duration. In this way, information in the form of a command to change the operational mode of the probe 20 has been communicated to the probe 20 by encoding that information in the form of a characteristic rotational movement of the probe 20 (note that this is just a single rotational movement, but is one of many possible rotational movements which the probe 20 could be made to perform), which is detected and decoded at the probe 20 to effect the change of operational mode of the probe 20.

It is also possible to use a predetermined characteristic movement or sequence of characteristic movements, for example one or more characteristic rotations, to put the probe 20 into a 'receptive' mode during which one or more further characteristic movements (e.g. rotations and/or accelerations) of the probe 20 are used to encode and communicate data to the probe 20, which is detected and decoded by the probe 20 for use at the probe 20 in some way. This possibility is illustrated by the flowchart of FIG. 13, in the case where the 'receptive' mode is a configuration loading mode, in which various configuration options are loaded into the probe 20.

In step T1 of FIG. 13, the characteristic movement(s) required to put the probe into the configuration loading mode is determined. In other words, in step T1 the command for putting the probe 20 into the configuration loading mode is encoded into one or more characteristic movement(s) to be performed by the probe 20. It could be that the user looks up the corresponding characteristic movement(s) in a user manual, with the encoded movements being programmed into the machine controller 10 via the interface 14. Alternatively, the user could indicate directly via the interface 14 that the configuration loading mode is required for the probe 20, with the controller 10 then performing a lookup to determine the corresponding characteristic movement(s) to be performed by the probe 20 in order to communicate a 'configuration loading mode' command (the encoded information) to the probe 20.

In step T2, the machine tool 1 is controlled to impart the movement(s) determined in step T1 to the probe 20, for example by using the movement system 5 and/or by rotating the spindle 3 around its rotational axis R, as described above with reference to FIGS. 1 to 4. In step T3, these movement(s) are detected at the probe 20 by movement sensors 21, and from these detected movements the probe controller 25 determines that the probe 20 has been commanded to enter the configuration loading mode (the decoded information). Accordingly, in step T4 the probe controller 25 puts the probe 20 into a configuration loading mode.

In step T5, it is determined what probe configuration data is to be communicated to the probe 20. For example, where the probe 20 is an optical probe (such as the example shown in FIG. 4, having a primary communications channel 13 as shown in FIG. 2 that is optically based), one such configuration option might be for the "Switch On Method" that is used for the optical channel 13, and another might be for the "Switch Off Method". Other functions that are controlled by configuration options might be "Enhanced Trigger Filter and Spindle Orientation capability", "Optical Transmission Type" and "Optical Power Setting". These functions are summarised in the table of FIG. 14, along with the possible configuration options that are available for each function. For example, the "Switch On Method" can be either "Optical On (Standard)" or "Optical On (3 s Delay)", while the "Switch Off Method" could be one of "Optical Off", "Short Timeout (12 s)", "Medium Timeout (22 s)" and "Long Timeout (134 s)".

In step T6, the probe configuration data determined in step T5 is encoded into one or more probe movements of a plurality of characteristic probe movements. Referring to the table of FIG. 14, since there are two possibilities for the "Switch On Method" function, this can be encoded into a single information bit, taking a '0' or a '1' value depending on the configuration choice required for that function. Similarly, there are four possibilities for the "Switch Off Method" function, so this can be encoded into two information bits, taking values of '00', '01', '10' or '11' depending on the configuration choice required for that function. A similar approach can be taken for the other functions shown in FIG. 14, such that the configuration options for all five functions of FIG. 14 can be encoded into nine information bits as shown in the table of FIG. 15. FIGS. 16A to 16E provide tables corresponding respectively to the functions of FIG. 14, with each table showing the bit position values for each possible configuration option associated with that function.

For each of the information bits #0 to #8 shown in the table of FIG. 15, a characteristic probe movement as shown in FIG. 10 can be used to communicate a value of '0' and a characteristic probe movement as shown in FIG. 11 can be used to communicate a value of '1'. This provides a scheme (or algorithm) for encoding the configuration data into characteristic probe movements. For example if it is required to configure the probe 20 as follows: (a) Optical On (3 s delay); (b) Medium Timeout (22 s); (c) Autoreset On/Filter On (16 ms); (d) Legacy (Start Filter On); and (e) Low Power. Using the on the "lookup tables" of FIGS. 16A to 16E, this configuration information would be encoded into a bit sequence of '1_10_011_01_0' (or just '110011010' without separators), with each of these bit values having an associated characteristic probe movement as shown in one or other of FIGS. 10 and 11 (depending on whether the bit value is '0' or '1').

In step T7 the machine tool 1 is controlled to impart the movement(s) determined in step T6 to the probe 20, which for the probe movements of FIGS. 10 and 11 would involve a combination of using the movement system 5 to accelerate the probe 20 in the Z direction and rotating the spindle 3 (with attached probe 20) around rotational axis R. In step T8, these movement(s) are detected at the probe by movement sensors 21 and decoded by the probe controller 25 to extract the configuration data sent by the machine 1. In step T9, the probe 20 is configured according to the decoded configuration data from step T8. Finally, in step T10 the configuration loading mode is ended by communicating a further command to the probe 20, with this command (information) being encoded as one or more movements of the probe 20 (each selected from a plurality of different characteristic movements) in a similar way to what is described above. Alternatively, the configuration loading mode could end automatically after a predetermined period of time.

FIG. 17 is a flowchart to illustrate a method embodying the present invention for putting the probe into a configuration reading mode and for subsequently ending configuration reading mode. As the name implies, this mode is for reading the current configuration from the probe 20 (in contrast to the method of FIG. 13 which is for writing a new configuration to the probe 20). Since this is similar to previous embodiments, only a brief description is required. In step P1, the command (which is a type of information) to put the probe 20 into configuration reading mode is encoded into one or more movements of the probe 20 (each selected from a plurality of different characteristic movements). In step P2 the machine tool 1 is controlled to impart the movement(s) determined in step P1 to the probe 20, and in step P3, these movement(s) are detected at the probe 20 by movement sensors 21 and decoded to recover the command sent from the machine controller 10. In response to receipt of the command, in step P4 the probe controller 25 puts the probe 20 into configuration reading mode. Because of this, in step P5 the current configuration data for the probe 20 is communicated to the probe interface 12 of the machine 1 over the primary communications (e.g. radio) channel 13 (see FIG. 2). This configuration data could be communicated via sequences of trigger pulses through the SKIP input (many modern controllers include a direct input for the probe's trigger signal often referred to as a SKIP input, where the probe trigger signal is effectively read immediately and the current axis position is 'latched' upon receipt of this signal). Then, in steps P7 to P10 a command is encoded and communicated from the machine 1 to the probe 20 (where it is decoded and acted on) to end the configuration data reading mode, and to put the probe 20 back into a standby mode.

FIG. 18 is a flowchart to illustrate a method embodying the present invention for putting the probe into a radio pairing mode. This method is intended to address a problem where, particularly in factories with a large number of machine tools 1 in a relatively small space, a probe 20 that has been paired to a probe interface 12 in a particular machine tool 1 is then moved to an adjacent machine tool 1. In this situation, it may be possible for the original probe interface 12 to communicate with the probe 20 after it has moved to a new machine tool 1. This creates the situation that a probe interface 20 will be receiving for example a seated status from the probe 20 irrespective of whether or the probe 20 in its spindle 3 is actually in contact with a workpiece 6, and this is very likely to lead to a machine crash (where the movement system 5 drives the probe 20 into the workpiece 6 causing damage to the probe 20 and/or other parts of the machine tool 1).

To overcome the above problem, the machine tool 1 performs a probing move in step Q1, and if no trigger signal is received back from the probe 20 before the machine reaches a target position (by which time a trigger signal would have expected to have been received), then it can be assumed that there is a possibility that the scenario described above has occurred. In this case the machine tool 1 proceeds to the subsequent steps shown in FIG. 18, in which a sequence of rotations varying in speed and direction is executed to force the probe 20 in its spindle 3 into an 'acquisition' state (or radio pairing mode). This is achieved in a similar manner as described above, with the command being encoded into a sequence of characteristic probe movements in step Q2, the probe 20 being moved accordingly in step Q3, and the movements of the probe 20 being detected and decoded in step Q4. In response to the received command, in step Q5 the probe is put into radio pairing mode. At the same time, the radio interface 12 is also be put into an acquisition state (or radio pairing mode) in step Q6, for example through the use of a sequence of probe start input pulses. Using a radio pairing routine performed respectively in steps Q7 and Q8 by the probe 20 and radio interface 12 respectively, the machine tool 1 is able to 're-pair' with the probe 20 that is in its own spindle 3, thereby overcoming the problem described above of the incorrect seated signal. In steps Q9 to Q11 a command is encoded and communicated to the probe 20 (again using one or more probe movements to encode and communicated the command to the probe 20) to end the radio pairing mode and to put the probe 20 back into a standby mode.

The various functions and sequences described above can be combined in very flexible ways. For example, it may be more practical (e.g. better for power management) to have two stages in a sequence, for example a "wake up" command and a separate "message" command, rather than combining these into a single movement (i.e. where the "wake up" and the "message" are part of the same movement). FIGS. 19A to 19C show further sequences of characteristic movements that might be performed in different scenarios, and of course there are countless other possibilities as well because of the flexibility offered by the proposed communication method. In FIGS. 19A to 19C, "CW" and "ANTI" denote a clockwise and anticlockwise rotation of the probe 20, respectively, at any rotational speed unless specified. If no rotation direction is specified (for example in FIG. 19C) then the rotation direction does not matter (and instead the movement is characterised by virtue of another motion property, such as spin speed and/or duration).

It is noted that WO 2004/090467 discloses a technique which also makes use of a probe rotation to switch power-intensive probe circuitry on or off. However, there just a single command and a single associated characteristic movement is disclosed in WO 2004/090467. The single command is effectively a "toggle power" command (i.e. switch on, if currently off, or switch off, if currently on), and the single associated characteristic movement a brief, constant-speed rotation in a single direction only. There is no suggestion in WO 2004/090467 of encoding and communicating a rich variety of information by representing the information based on a plurality of different characteristic movements, which is what is provided for with an embodiment of the present invention. The method of WO 2004/090467 is not adapted to handle more than one type of command. The technique of WO 2004/090467 was a development of a technique for switching on a probe as described in U.S. Pat. No. 4,599,524 in which, after the probe has been inserted in the spindle of a machine tool, it is powered on by a brief rotation of the spindle, using a centrifugal switch within the probe to respond to such rotation. After use, the battery may be disconnected by a further such rotation, or by a delay element within the circuit of the probe which times out after a predetermined period of non-use of the probe.

Previous implementations of machine tool probes, such as described in WO 2004/090467, utilise centripetal acceleration experienced by an accelerometer mounted in the probe as a means of detecting axial rotational velocity when the probe is mounted in a machine tool spindle, for the purposes of activating the probe from a standby state, or deactivating it from an operating state. The centripetal acceleration detected, is independent of the direction of rotation and hence the probe is only able to detect the rotation, but not the direction. With an embodiment of the present invention, detection of the direction of rotation (or other characteristic movements) is used as another input to facilitate more complex functionality. In addition to this, modulation of the angular velocity can also be used to convey information to the probe.

The advent of low power MEMS (microelectromechanical systems) gyroscopes in conjunction with a three-axis accelerometer (so called Inertial Measurement Units), facilitates the determination of rotation direction as well as magnitude, in three rotational degrees of freedom (three rotational axes). When used in conjunction with acceleration information in three linear axes this provides measurement with six degrees of freedom. The implementation of movement sensors 21 would ideally account for the fact that the probe 20 could be mounted in either a vertical machine tool spindle 3, as shown in FIG. 20A, or a horizontal machine tool spindle 3, as shown in FIG. 20B.

As well as encoding or mapping each of a plurality of different individual discrete commands (or other discrete types of information) into a corresponding set of one or more probe movement(s), it is also possible to use an algorithm to encode a continuous variable into an appropriate characteristic probe movement. For example, the probe 20 could sense the spin or rotation speed to set some probe parameter (such as a timing filter) based on the measured spin speed. For example, if the spin speed is measured at 651 rpm then a 6.51 ms filter is set at the probe 20, or if 725 rpm is measured then a 7.25 ms filter is used. In that case, the encoding algorithm used at the machine controller 10 would effectively be "R=F×100" where F is the desired filter duration in milliseconds and R is the rotation speed in revolutions per minute (rpm) for the characteristic probe movement (rotation). The decoding algorithm used at the probe 20, to extract the desired filter duration F from the measured rotation speed R, would be the inverse of the encoding algorithm: "F=R/100".

It will also be apparent from the description above that information can be encoded as a single movement, having a number of different possible states, e.g. with different rpm represent different actions, or as a sequence of movements. It is also noted that different sequences could decode to the same information. For example, three characteristic movements A, B and C in any order could represent the same information (i.e. ABC is the same as BAC which is the same as CAB) but a different combination of those movements A, B and C would represent different information (i.e. ABC is different to AAB). It is also possible that first and second bits of information are encoded as first and second different characteristic motions, but where the first and second characteristic motions are superimposed (performed simultaneously; for example a translation in Z would give first information and simultaneous rotation around Z would give second information.

Although an embodiment of the present invention is described above in the context of a machine tool, the same technique can be used with such a probe mounted on other types of coordinate positioning machine. For example, when used with a robot arm, rotation around one or more of the rotary joints of the robot arm can be used to perform the procedure described above in an entirely equivalent manner (to replace rotation of the spindle 3 around axis R as described above). An articulated robot arm would often have a final rotary joint having a rotational axis that is arranged axially in relation to the arm, so this final joint (with attached probe) could be used in a very similar manner to rotation of the spindle 3 in the machine tool embodiment above.

The machine controller 10 and probe controller 25 may be a dedicated electronic control system and/or may comprise a computer operating under control of a computer program. For example, the machine controller 10 may comprise a real-time controller to provide low-level instructions to the motion system 5, and a PC to operate the real-time controller. It will be appreciated that operation of the coordinate positioning machine 1 can be controlled by a program operating on the machine 1, and in particular by a program operating on a machine controller 10 such as that illustrated schematically in FIG. 1. It will also be appreciated that operation of the probe 20 can be controlled by a program operating on the probe 20, and in particular by a program operating on a probe controller 25 such as that illustrated schematically in FIG. 4. Such a program can be stored on a computer-readable medium, or could, for example, be embodied in a signal such as a downloadable data signal provided from an Internet website. The appended claims are to be interpreted as covering a program by itself, or as a record on a carrier, or as a signal, or in any other form.

The invention claimed is:

1. A method of communicating information to a measurement probe mounted on a coordinate positioning machine, comprising encoding the information as one or more of a plurality of characteristic movements of the probe, controlling the machine to impart the movement(s) to the probe, detecting the movement(s) at the probe, and decoding the information at the probe from the detected movement(s).

2. A method as claimed in claim 1, comprising encoding the information as a sequence of two or more of the plurality of characteristic movements.

3. A method as claimed in claim 1, comprising performing an operation at or controlling operation of the probe in dependence on the decoded information.

4. A method as claimed in claim 1, wherein the information comprises at least one of: (a) configuration data for the probe; and (b) one or more commands or operations or instructions to be performed by the probe.

5. A method as claimed in claim 1, comprising using one or more movements as a command to put the probe into a data reception mode, during which data reception mode one or more further movements are used to communicate data to the probe, or into a data transmission mode, during which data transmission mode the probe communicates data to a machine controller or interface of the machine.

6. A method as claimed in claim 5, wherein the probe communicates the data to the machine controller or interface during the data transmission mode using a sequence of trigger pulses.

7. A method as claimed in claim 5, wherein the data comprises probe configuration data and comprising using the configuration data received at the probe during the data reception mode to configure the probe.

8. A method as claimed in claim 1, wherein encoding the information comprises at least one of: (a) selecting one or more movements representing the information from a plurality of predetermined characteristic movements, for example stored in a lookup table or presented in an instruction manual; and (b) using a predetermined algorithm to convert the information into a corresponding one or more movements to be performed by the probe.

9. A method as claimed in claim 1, wherein the one or more movements comprises at least one rotational movement of the probe and/or at least one translational movement of the probe, for example wherein the or each movement is a rotational movement of the probe.

10. A method as claimed in claim 1, comprising using at least one movement sensor on the probe to detect the one or more movements and/or to distinguish the one or more movements from other movements of the probe.

11. A method as claimed in claim 1, wherein the machine is operable to rotate the probe around a rotational axis of the machine, such as the rotational axis of a spindle of the machine for example where the machine is a machine tool, and wherein the movement(s) comprise at least one rotational movement about the rotational axis of the machine.

12. A method as claimed in claim 1, wherein there are a plurality of different movements or combinations of characteristic movements from which to choose, with each corresponding for example to a different respective operation to be performed by the probe.

13. A method as claimed in claim 1, wherein the measurement probe is a wireless measurement probe, or wherein the measurement probe is instead a measurement device such as a measurement probe or a tool setter.

14. A method as claimed in claim 1, wherein the coordinate positioning machine is a machine tool.

15. A method as claimed in claim 1, wherein the method is for providing a secondary means of communication, there being a primary means of communication different to the secondary means of communication, with the primary means of communication being used to communicate during normal use of the probe, for example for communicating measurement data during a measurement operation.

16. A method of controlling a measurement probe mounted on a coordinate positioning machine, comprising communicating information to the probe using a method as claimed in claim 1, and performing an operation at or controlling operation of the probe in dependence on the decoded information.

17. A measurement probe for use in a method as claimed in claim 1, the measurement probe being mountable to the machine and comprising: at least one movement sensor for sensing movement imparted to the measurement probe by the machine; and a controller for determining whether the sensed movement comprises one or more of the plurality of characteristic movements of the probe, and performing an operation at or controlling operation of the probe in dependence on the determination.

18. A measurement probe or probe controller or machine controller configured to use a method as claimed in claim 1.

19. A computer-readable medium having stored therein computer program instructions for controlling a computer or a machine controller or a probe controller to perform or use a method as claimed in claim 1.

* * * * *